US006954657B2

(12) United States Patent
Bork et al.

(10) Patent No.: US 6,954,657 B2
(45) Date of Patent: Oct. 11, 2005

(54) WIRELESS COMMUNICATION DEVICE HAVING INTELLIGENT ALERTING SYSTEM

(75) Inventors: Stephan Bork, Murphy, TX (US); Oren E. Eliezer, Plano, TX (US); Carl Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 824 days.

(21) Appl. No.: 09/851,309

(22) Filed: May 8, 2001

(65) Prior Publication Data

US 2002/0010008 A1 Jan. 24, 2002

Related U.S. Application Data (60) Provisional application No. 60/215,249, filed on Jun. 30, 2000.

(51) Int. Cl.$^7$ .................................................. H04B 1/38
(52) U.S. Cl. .................. 455/567; 455/550.1; 455/41.2; 455/67.7
(58) Field of Search .............................. 455/567, 550.1, 455/41.2, 412.1, 67.7, 226.1, 226.3, 226.4, 575.1, 563, 67.11, 41; 340/7.58

(56) References Cited

U.S. PATENT DOCUMENTS

| | | | |
|---|---|---|---|
| 4,786,982 A | | 11/1988 | Wakahara et al. |
| 5,337,356 A | * | 8/1994 | Shinozaki .................... 455/567 |
| 5,604,791 A | | 2/1997 | Lee |
| 5,642,413 A | | 6/1997 | Little |
| 5,696,497 A | * | 12/1997 | Mottier et al. ............. 340/7.58 |
| 5,715,296 A | | 2/1998 | Schornack et al. |
| 5,722,071 A | | 2/1998 | Berg et al. |
| 5,870,684 A | * | 2/1999 | Hoashi et al. .............. 455/567 |
| 5,877,695 A | | 3/1999 | Kubes et al. |
| 5,912,482 A | | 6/1999 | Morimoto |
| 5,956,626 A | | 9/1999 | Kaschke et al. |
| 5,969,759 A | | 10/1999 | Morimoto |
| 6,002,945 A | | 12/1999 | McDuffee |
| 6,005,612 A | | 12/1999 | Kikuchi et al. |
| 6,011,967 A | | 1/2000 | Wieck |
| 6,018,671 A | | 1/2000 | Bremer |
| 6,026,306 A | | 2/2000 | Foladare et al. |
| 6,026,358 A | * | 2/2000 | Tomabechi ................. 704/232 |
| 6,263,218 B1 | * | 7/2001 | Kita ............................ 455/567 |
| 6,408,187 B1 | * | 6/2002 | Merriam ..................... 455/67.7 |
| 6,603,397 B2 | * | 8/2003 | Bronson ..................... 455/41.2 |
| 6,615,057 B1 | * | 9/2003 | Pettersson ................... 455/558 |
| 6,625,474 B1 | * | 9/2003 | Bussan et al. .............. 455/567 |
| 6,675,026 B2 | * | 1/2004 | Yoon ........................... 455/567 |
| 6,735,457 B1 | * | 5/2004 | Link et al. ................ 455/575.1 |
| 6,748,210 B2 | * | 6/2004 | Dutta et al. .............. 455/414.1 |
| 6,882,860 B1 | * | 4/2005 | Kim ......................... 455/550.1 |

* cited by examiner

*Primary Examiner*—Lana Le
(74) *Attorney, Agent, or Firm*—Ronald O. Neerings; Wade James Brady, III; Frederick J. Telecky, Jr.

(57) ABSTRACT

A wireless device (100) having an optimum alert sequence definition analyzes its environment, including time and type of incoming call, and selects an appropriate alert signal sequence. A central processing unit (114) included within the device (100) is responsive to a transmitted signal from an external communications device to generate active and passive sonic sensing. The reflected signal received through the microphone (110) and a predetermined set of values or ranges stored in a memory (102) coupled to the central processing unit (114) are used as input for a program of instructions tangibly embodied in a programmable storage device executable by the central processing unit (114). Based upon processing of this reflected signal, the central processing unit (114) determines which alert signal is optimum given the environment.

The device (100) may further include characterization of the environment based on processing of the ambient noise within the environment and several inputs including: manual inputs (user indication/selection), real time clock (including date), light sensing, temperature sensing, cellular receiver indications (RSSI and local network ID), motion sensing, caller identification, global positioning system data, and radio link reception (i.e. Bluetooth: office/home network, etc.).

24 Claims, 5 Drawing Sheets

WIRELESS COMMUNICATION DEVICE HAVING INTELLIGENT ALERTING SYSTEM

This application claims benefit of Provisional application No. 60/215,249 filed Jun. 30, 2000.

FIELD OF THE INVENTION

The present invention relates to a wireless communication device, and, more particularly, to a wireless communication device having an intelligent alerting system that generates an alert signal optimized for the environment of the wireless device.

BACKGROUND OF THE INVENTION

Wireless communication devices, hereinafter "wireless devices", use various alert techniques to indicate to a user of the wireless device that an incoming desired signal has been received. For example, a radiotelephone alerts the user when an incoming call signal is received, and a pager alerts the user when an incoming page signal is received. Generally, these alert techniques include audible, visual and tactile alert generators. The audible alert generator is typically implemented with an acoustic transducer, i.e. a speaker, sometimes known as a ringer. The visual alert generator is typically implemented with a display or a separate indicator. The tactile alert generator is typically implemented with an axially offset counter-weight driven by a motor to cause a vibrating sensation.

The sound produced by audible alert generators, however, can be disturbing to others in environments where there is a low ambient noise level. In addition, the sound produced may not be heard by the user in environments where there is a high ambient noise level.

The visual indicator produced by visual alert generators can go undetected by the user for some period of time until the user actually looks at the visual indicator. Therefore, the audible alert generator is typically used as a primary alert and the visual alert generator is typically used as a secondary or redundant alert.

The tactile sensation produced by tactile alert generators can go undetected by the user when the wireless device is not worn by the user or closely coupled to the user in some manner. Therefore, the tactile alert generator is typically used in environments where the ambient noise level is very low such that others in the area are not disturbed or environments where the ambient noise level is very high such that the user is alerted when the audible alert cannot be heard.

Some wireless devices offer advanced ringing schemes such that a ringing tone that starts at low volume and increases its volume continuously until the sound generated reaches its maximum volume or the user answers the call. Others offer mixed alerting schemes for incoming calls and messages such that for a predetermined time tactile sensation is produced and then for another predetermined time thereafter sound is produced. Calls, messages, and reminder-alarms are often missed due to unnoticed alerts, either because of environments where the ambient noise level is very high or due to the location of the wireless devices within a purse, briefcase or other carrying accessory.

U.S. Pat. No. 5,956,626, which is incorporated herein, discloses various types of sensors available and introduces an electromagnetic wave proximity sensor. Many sensors exist including motion sensor, capacitance sensor (infrared sensor), proximity sensors include eddy-current sensors, variable reluctance sensors, Hall-effect sensors, reed switch sensors, reflective optical sensors, metal detecting sensors, and microwave sensors, to name a few.

There, however, exists no intelligent alerting system that 'listens' to the environment of the wireless device by sampling the noise level surrounding the wireless device and generating either a tactile, visual, or audible alert signal based upon a programmed instruction set executable by a central processing unit within the wireless device. Furthermore, there are no existing alerting systems that use a multiplicity of sensors and environmental statistics including Received Signal Strength Indicator (RSSI), cellular network ID, and conventional radio-link reception indicators (i.e. Bluetooth—a short-range, cable replacement, radio technology) to determine a preferred alert signal. Accordingly, there is a need for a wireless device having an intelligent alerting system that devises an optimum alert sequence definition from the operating environment of the wireless device.

SUMMARY OF THE INVENTION

To address the above-discussed deficiencies of wireless communication device alerting systems, the present invention is directed to a wireless device having an intelligent alerting scheme to generate a preferred alert signal for the operating scenario of the wireless device. A first embodiment includes a central processing unit connected to a transceiver to communicate with an external communications device. A user interface may include a display and key set connected to the central processing unit. A variety of alert generators are connected to the central processing unit to generate an assortment of alert signals. A codifier/decodifier connects between the central processing unit and a microphone. In a first mode of operation, passive audible sensing of the environment occurs through the use of the microphone. In a second mode of operation, the codifier/decodifier couples to a speaker to generate active sonic sensing using the microphone, speaker and the central processing unit. Thus, the central processing unit, responsive to a transmitted signal from the external communications device, generates passive audible sensing through the microphone or active sonic sensing through the speaker and receives the reflected signal through the microphone. A predetermined set of values or range of values stored in a memory coupled to the central processing unit and a program of instructions tangibly embodied in a programmable storage device executable by the central processing unit define an alert sequence definition. This program of instructions may include neuron network algorithms to incorporate a self-learning process within the wireless device to continuously improve the optimization sequence. Accordingly, the central processing unit, responsive to the reflected signal and the alert sequence definition, determines which alert signal is optimum given the environment.

A second embodiment may further include characterization of the environment based on processing of the ambient noise within the environment and several inputs including: manual inputs (user indication/selection), real time clock (including date), light sensing, temperature sensing, cellular receiver indications (RSSI and local network ID), passive sonic/ultrasonic sensing (using the microphone, ear-piece, and DSP), active sonic/ultrasonic sensing (using the speaker, microphone, ear-piece, and DSP), motion sensing, and radio link reception (i.e. Bluetooth: office/home network, etc.).

The advantages of the present invention include and are not limited to a reliable wireless device having an intelligent alerting system that generates an optimum alert given the environment of the wireless device such that missed calls, messages, and reminder-alarms are minimized. Whether the device is in a high or low ambient noise environment, or concealed within a carrying accessory, unnoticed alerts are minimized. In addition, disturbing and undesirable alerts will not be activated in an environment where there is a low ambient noise level.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein:

FIG. 1b is a flow chart for illustrating the operation of the first embodiment of the wireless device shown in FIG. 1a;

FIG. 1c is a flow chart for illustrating the operation of user modification of an alert sequence definition of the first embodiment of the wireless device shown in FIG. 1a;

DETAILED DESCRIPTION OF PREFERRED EMBODIMENTS

Figure 1A:
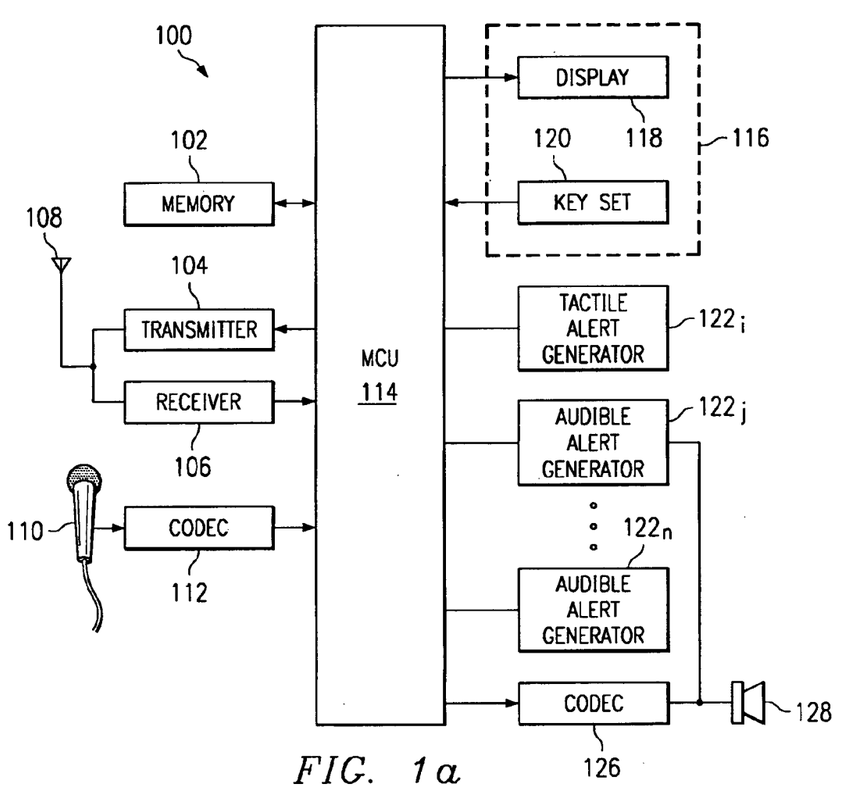
FIG. 1a is a first embodiment of a wireless communication device having an intelligent alerting system in accordance with the present invention.

As shown in FIG. 1, a wireless communication device 100 having an intelligent alerting system in accordance with the present invention includes central processing unit 114 that devises an optimum alert sequence definition from determining the operating environment of the wireless communication device 100. In addition, central processing unit 114 adjusts the audible, visual, and tactile alert signals based upon the operating environment. According to one aspect of the invention, noise (an analog signal) surrounding the wireless device 100 is sensed by the microphone 110. In response to a transmitted signal from an external device (not shown), the central processing unit 114 sends a control signal to the codifier 112 to convert the analog signal into a digital one. A programmable storage device (not shown) which is readable by the central processing unit 114 contains a program of instructions executable by the central processing unit 114. This program of instructions may include neuron network algorithms to incorporate a self-learning process within the wireless device to continuously improve the optimization sequence. In response to the digital signal, the central processing unit 114 processes the digital signal using the stored threshold coefficients and the program of instructions to determine a preferred alert signal. Accordingly, the central processing unit 114 sends at least one control signal to a respective alert signal generator: a tactile alert generator $122_i$, an audible alert generator $122_j$ or a display 118.

According to another aspect of the invention, the response to a transmitted signal from an external device (not shown), the central processing unit 114 sends a control signal to the speaker 128 to generate a tone. In addition, the central processing unit 114 sends a control signal to the codifier 112 to convert the analog signal sensed by microphone 110 into a digital signal. The central processing unit 114 processes the digital signal using the stored threshold coefficients and the program of instructions to determine a preferred alert signal and sends at least one control signal to the selected alert signal generator.

According to another yet aspect of the invention, the user will be able to "train" the wireless device 100 to respond however the user chooses. The display 118 is capable of displaying menus of information which may be selected. A menu designated for the training of the intelligent alerting system may include a default set and reset feature whereby the user sets all of the defaulted values after a series of questions have been answered using a selection key. Within this menu, the user may define the different alerts for different types of environments, such as "quiet", "noisy", "day", "night", "belt, "purse", etc. A standard defaulted optimum alert sequence definition may be maintained within memory 102. The menu may include an option to modify the last alert response given based upon the environment of the wireless device. The user may select the preferred response and store this response so that future determinations will include the user's input.

The wireless device 100 includes a central processing unit 114 connected to a user interface 116. The user interface 116 includes a display 118 and a key set 120, both connected to central processing unit 114. The wireless device 100 can be a cellular radiotelephone, a cordless radiotelephone, a paging/messaging device, or any other portable device that communicates with another device in a telephone-like manner (i.e. a one-way or two-way communications device), and "wireless device" as used herein refers to each of these and their equivalents. Subjectively, the user interface 116 may also include a conventional microphone 110 and speaker 128 connected to central processing unit 114 through codifier/decodifier (CODEC) 112 and 126, respectively.

The key set 120 is implemented using any suitable means, such as a push-button keypad, a touch screen, or the like. The display 118 is implemented using a suitable commercially available apparatus, such as liquid crystal display (LCD), a light emitting diode (LED) display, or the like. The central processing unit 114 is implemented using one or more suitable microcontrollers, microprocessors, or digital signal processors, such as a Texas Instruments $TMS_{320}C54x$™ DSP core. The central processing unit 114 may be programmable where it includes a programmable storage device (not shown) tangibly embodying a program of instructions executable by the central processing unit. In the alternative, the central processing unit 114 may be implemented using a microcontroller coupled to a separate programmable storage device, such as a digital signal processor, that tangibly embodies a program of instructions executable by the central processing unit 114.

A memory 102 storing threshold coefficients for noise is connected to the central processing unit 114. In addition, a plurality of alert generators $122_i$–$122_n$ connect to the central processing unit 114. These may include a tactile alert generator $122_i$, audible alert generator $122_j$ or a display mechanism such as display 118. The tactile alert generator $122_i$ can be implemented using a transducer; a motor (not shown) which drives an offset weight (not shown) to rotate thereby creating a vibration; or any other suitable means. The audible alert generator $122_j$ may be connected to the central processing unit 114. Generally, the antenna 108, the transmitter 104, the receiver 106, the speaker 128, the microphone 110, the tactile alert device $122_i$ and audible alert device $122_j$ are each individually well known in the art, and hence no additional description need be given except as may be necessary to facilitate the understanding of the present invention. Further, the general operation of a radiotelephone is well known in the art and will not be described except as may be necessary to facilitate the understanding of the present invention.

The wireless device transceiver includes a transmitter 104 and a receiver 106. In general, the central processing unit 114 outputs signals to transmitter 104, which modulates the signals for transmission via antenna 108. The signals output to the transmitter 104 include control signals, signals detected by microphone 110, or any other signal for communication to an external device (not shown). Signals detected by antenna 108 are demodulated by receiver 106, and the resulting signal is input to central processing unit 114. In the alternative, central processing unit 114 may demodulate the signal. Accordingly, central processing unit 114 outputs these signals to the speaker 128 or uses this signal in its control processes.

In operation, the central processing unit 114 detects an incoming call in decision block 154 (FIG. 1b) to initiate an optimum alert subroutine 150. The central processing unit 114 controls the codifier 112 connected to the microphone 110 to sense the environment or receive the analog signal that is 'heard' by the microphone 110 as indicated in block 156. The codifier 112 then converts the analog signal into a digital one, as indicated in block 158. Responsive to this digital signal, the central processing unit 114 retrieves the threshold coefficients from memory 102 as indicated by block 160. Block 162 illustrates that the central processing unit 114 executes the program of instructions located within the programmable storage device (not shown) to process the digital signal. Based upon the predetermined coefficients and the program of instructions, decision block 164 indicates that the central processing unit 114 determines whether the processed digital signal meets the predetermined criteria for an audible alert. If it does, block 166 indicates that the central processing unit 114 will send a control signal to the audible alert generator 122$_j$ connected to the speaker 128 to generate an audible alert signal. It is envisioned that the volume and frequency of the audible alert signal may be determined based upon the determination of the processing of the program of instructions in block 162. If as indicated by decision block 164 the optimum alert signal is not an audible alert signal, the central processing unit 114 will decide whether a tactile alert signal is best, as indicated by decision block 168. If so, the central processing unit 114 will send a control signal to the tactile alert generator 122$_i$ to generate a tactile alert signal as indicated by block 170. In the alternative, the central processing unit 114 can send a control signal to display 118 to generate a visual alert signal as indicated by block 172. Accordingly, once the alert signal has been generated, the central processing unit 114 will process the call or message as indicated in block 174.

Figure 1B:
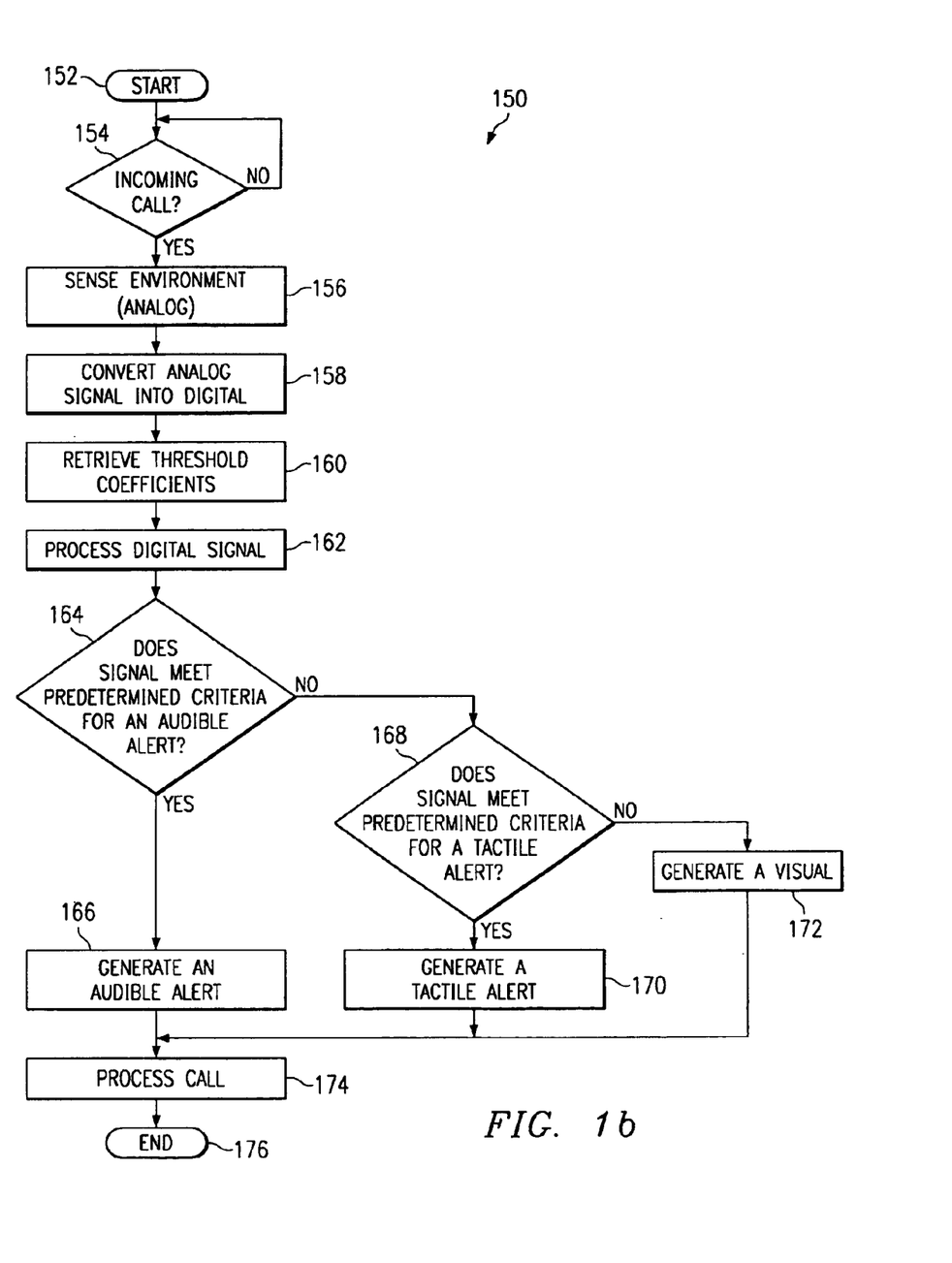

In the alternative, it is envisioned that when the response to decision block 154 is negative an optional block similar to block 156 may be implemented whereby the central processing unit 114 periodically controls the codifier 112 and the microphone 110 at predetermined intervals of time to sense the environment or receive the analog signal that is 'heard' by the microphone 110. Accordingly, block 156 would be eliminated since there would be no need to obtain environmental information due to the continuous update of sensor readings. Thus, the characterization of the environment does not start in response to an incoming call solely. Existence of historic estimations and measurements could help improve the reliability of the device 100.

Figure 1C:
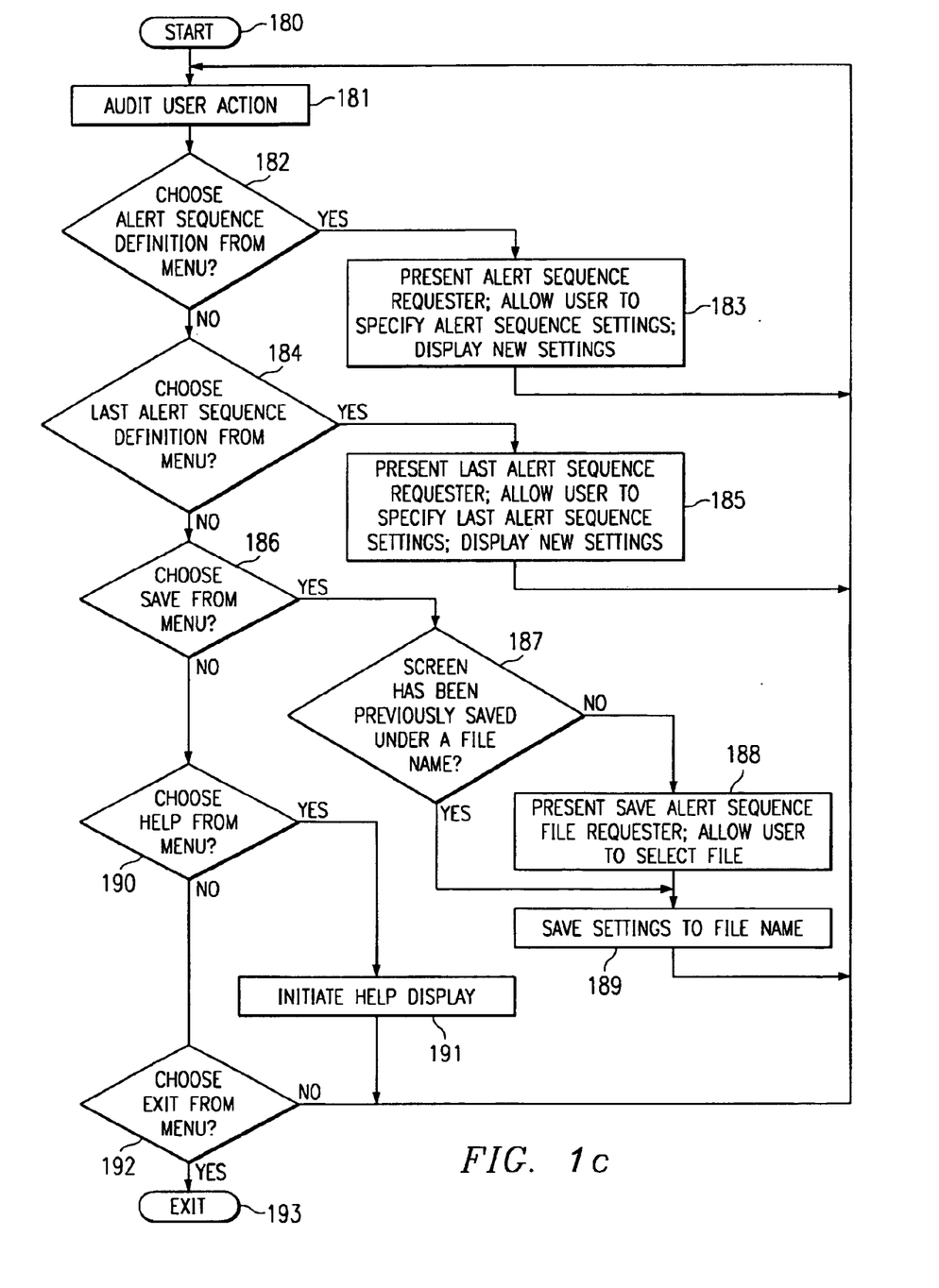

In a user activated mode, as shown in FIG. 1c, the user will be able to "train" the wireless device 100 to respond according to the user's preference. The display 118 is capable of displaying menus of information which may be selected. A menu designated for the training of the optimum alert sequence definition may include a default set and reset feature whereby the user sets all of the defaulted values after a series of questions have been answered using a selection key. As indicated by block 181, the central processing unit 114 awaits user action. The user may, as indicated by block 182, choose to modify the alert sequence definition. If the user desires the alert sequence definition entirely, as indicated in block 183, the central processing unit 114 will present on the display 118 the alert sequence requester routine which will ask the user a standard set of questions to define the different alerts for different types of environments, such as "quiet", "noisy", "day", "night", "belt, " purse", etc. The new alert sequence definition settings will be displayed on the screen. If the user wishes to modify just the last alert signal response, the user may choose to modify the last alert sequence definition from the menu as indicated in block 184. The central processing unit 114, as indicated in block 185, will enable the user to modify the last alert signal response through a last alert sequence requester routine which will ask the user a standard set of questions to define a different alert signal for the last sensed environment. The new setting will be displayed on the display 118. If the user desires, he may choose to save the new settings as indicated in decision block 186. The new settings may be saved to a defaulted file or a user customized file as indicated by blocks 187, 188 and 189. Optionally, the user may choose help from the menu which will initiate a help display as indicated by blocks 190 and 191. In the alternative, the user may exit the menu as indicated by block 192. Thus, the user may select a preferred response and store this response so that future determinations will include the user's input whenever the wireless device is in the same environment which generated the last alert response.

The advantages of the present invention include and are not limited to a reliable wireless device having an intelligent alerting system. The probability of the user missing a call, message, or reminder will decrease based upon the optimum alert sequence definition introduced by the intelligent alerting system. In addition, a disturbing and undesirable alert will not be activated in an environment where there is a low ambient noise level or otherwise.

It is envisioned that the central processing unit is capable of processing a program of instructions for speech recognition. Based upon recognizable patterns of speech, the central processing unit may generate an optimum alert scheme. For example, if the environment of the wireless device senses the user's voice, the central processing unit makes a determination upon that and other variables which alert signal to initiate.

Figure 2:
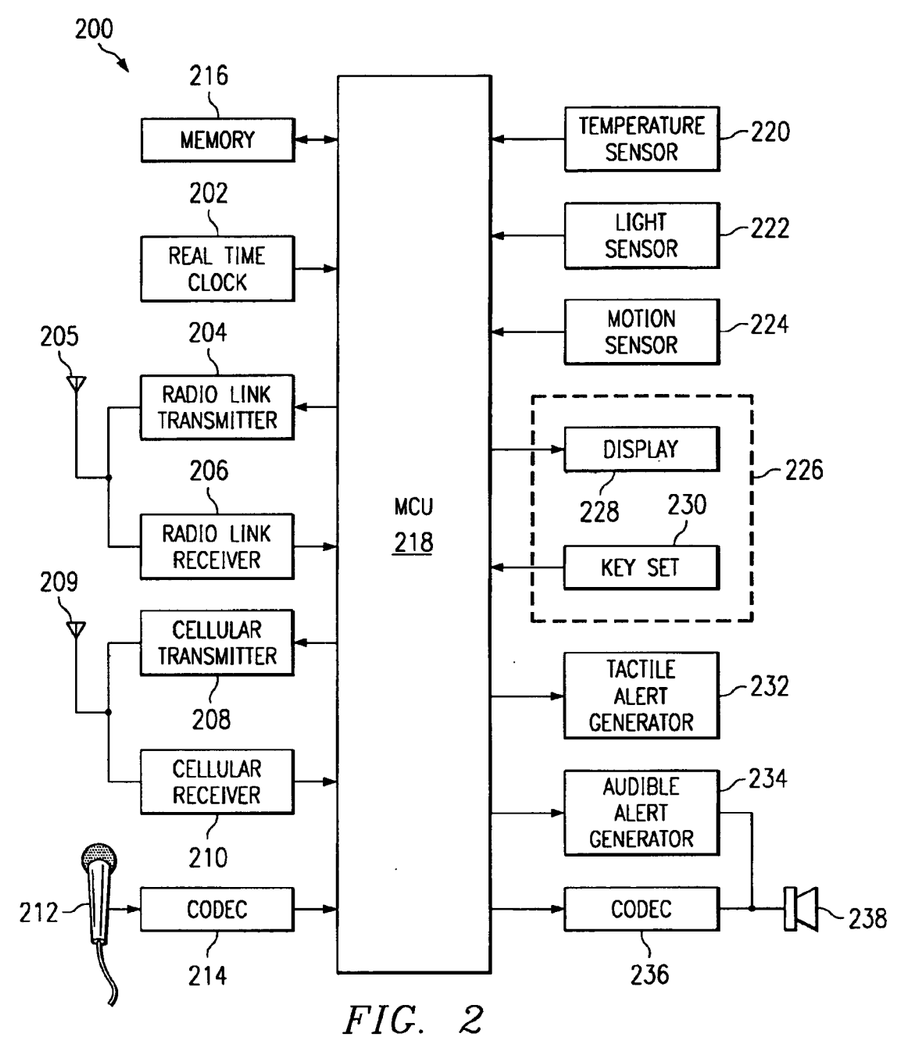
FIG. 2 is a second embodiment of a wireless communication device having an intelligent alerting system in accordance with the present invention.

FIG. 2 displays a second embodiment of a wireless communication device 200 having an intelligent alerting system in accordance with the present invention. It includes central processing unit 218 that devises an optimum alert sequence definition from determining the operating environment of the wireless device 200 using a radio link (i.e. Bluetooth) transceiver, a real-time clock 202, a temperature sensor 220, a light sensor 222, a motion sensor 224, the cellular network ID and a Received Signal Strength Indicator (RSSI—not shown). Based upon a predetermined set of criteria, the audible, visual, and tactile alert signals are activated and initiated, accordingly.

According to one aspect of the invention, noise (an analog signal) surrounding the wireless device 200 is sensed by the microphone 212 and, in response to a transmitted signal from an external device (not shown), the central processing unit 218 sends a control signal to the codifier 214 to convert the analog signal into a digital one. A programmable storage device which is readable by the central processing unit 218 contains a program of instructions executable by the central processing unit 218. In response to the digital signal, the central processing unit 218 processes the digital signal based upon stored threshold coefficients, various sensor data, and empirical strength and position data to determine a preferred alert signal. Accordingly, the central processing unit 218 sends at least one control signal to at least one respective alert signal generator: a tactile alert generator 232, an audible alert generator 234 or a display 228.

According to another aspect of the invention, the In response to a transmitted signal from an external device (not shown), the central processing unit 218 sends a control signal to the speaker 238 to generate a tone. In addition, the central processing unit 218 sends a control signal to the codifier 214 to convert the analog signal sensed by microphone 212 into a digital signal. The central processing unit 218 processes the digital signal using the stored threshold coefficients and the program of instructions to determine a preferred alert signal and sends at least one control signal to the selected alert signal generator.

The wireless device 200 includes a central processing unit 218 connected to a user interface 226. The user interface 226 includes a display 228 and a key set 230, both connected to central processing unit 218. The wireless device 200 can be a mobile telephone, a cellular radiotelephone, a cordless radiotelephone, or any other portable device that communicates with another device in a telephone-like manner, and "wireless device" as used herein refers to each of these and their equivalents. Subjectively, the user interface 226 may also include a conventional microphone 212 and speaker 238 connected to central processing unit 218 through codifier/decodifier (CODEC) 214 and 236, respectively.

The key set 230 is implemented using any suitable means, such as a push-button keypad, a touch screen, or the like. The display 228 is implemented using a suitable commercially available apparatus, such as liquid crystal display (LCD), a light emitting diode (LED) display, or the like. The central processing unit 218 is implemented using one or more suitable microcontrollers, microprocessors, or digital signal processors, such as a Texas Instruments TMS$_{320}$C54x™ DSP core. The central processing unit 218 may be programmable where it includes a programmable storage device (not shown) tangibly embodying a program of instructions executable by the central processing unit. In the alternative, the central processing unit 218 may include a separate programmable storage device, such as a digital signal processor, that tangibly embodies a program of instructions executable by the central processing unit 218.

A memory 216, connected to central processing unit 218, stores threshold coefficients relating to noise, motion, temperature, caller network identification, radio link information, and light with respect to location and time of day. A temperature sensor 220, a light sensor 222, a motion sensor 224 and a real-time clock 202 couple to central processing unit 218 to supply the central processing unit 218 with environmental temperature, lighting conditions, motion, and time, respectively. A plurality of alert generators 232 and 234 connect to the central processing unit 218. These may include a tactile alert generator 232, audible alert generator 234 or a display mechanism similar to display 228. A tactile alert generator 232 can be implemented using a transducer; a motor (not shown) which drives an offset weight (not shown) to rotate thereby creating a vibration; or any other suitable means. An audible alert generator 234 may be connected to the central processing unit 218.

It is envisioned that an Intelligent alert override feature may be included within device 200, such that it is activated by a human interface including, but not limited to, a keypad, voice interface, or a touch screen. Thereby, the human interface immediately enables the user to disable or enable the intelligent alert feature.

The wireless device transceiver includes a transmitter 208 and a receiver 210. In general, the central processing unit 218 outputs signals to transmitter 208, which modulates the signals for transmission via antenna 209. The signals output to the transmitter include control signals, signals detected by microphone 212, or any other signal for communication to an external device (not shown). Signals detected by antenna 209 are demodulated by receiver 210, and the resulting signal is input to central processing unit 218. Central processing unit 218 outputs these signals to the speaker 238 or uses this signal in its control processes.

In a Time Division Duplex (TDD) system, a system commonly used for digital radio communications, monitoring of a Received Signal Strength Indicator (RSSI—not shown) is a standard technique for determining the characteristics of a received signal. In analog systems, as well, monitoring of a Received Signal Strength Indicator is a standard technique for determining the characteristics of a received signal. A received signal strength of an RF signal may be measured at a predetermined number of test points in relation to the central transmitter (i.e. a cellular base station tower-not shown) using the RSSI. Additionally, the exact location the device can be determined by a global positioning system (GPS) receiver (not explicitly shown) that may be located within the wireless device 200. In the alternative, the position data can be detected using a control channel of a communications device as such is known to those skilled in the art. Thus, using the empirical signal strength and position data derived using the control channel and GPS and RSSI receivers, the central processing unit 218 can determine an optimum alerting sequence.

Further, as known to those skilled in the art, if a system identification (ID) is valid in concert with the cellular network, a cellular service indicator (not shown) within the wireless device indicates if the wireless device is in a home or roam mode. A control packet from a packet header of a transmitted signal, received by receiver 210, contains the cellular network identification (ID). Thus, in addition to the empirical signal strength and position data of the RSSI receiver, central processing unit 218 may use cellular network identification information to determine the optimum alert sequence definition.

The use of both RSSI and cellular network ID can enhance probability of a correct decision by distinguishing between two locations where the user is commonly located. Use of substantially different RSSI levels or different network IDs, may be beneficial, particularly when all other characteristics are similar.

The radio link transceiver includes a transmitter 204 and a receiver 206. The central processing unit 218 outputs signals to radio link transmitter 204, which modulates the signals for transmission via antenna 205. The signals output to the radio link transmitter 204 include control signals or any other signal for communication to an external device (not shown). Signals detected by antenna 205 are demodulated by radio link receiver 206, and the resulting signal is input to central processing unit 218. Central processing unit 218 uses this signal in its control processes.

A variety of conventional radio links may be used to implement the transceiver, including transmitter 204 and receiver 206. One particularly advantageous radio link is the Bluetooth radio link, which is a short-range, cable replacement, radio technology. A system having Bluetooth radio technology may use a transmitted signal to identify a stationary access point with which the device 200 communicates and, thus, determine the location of the device 200. Based upon the location, the central processing unit 218 may be able to determine the optimum alerting sequence. Bluetooth radio link allows data synchronization between the wireless device and a peripheral device, such as a personal computer (PC) or a personal digital assistant (PDA). Bluetooth also enables the capability of communication between a wireless headset unit and the wireless device. In addition, Bluetooth radio link technology enables the wireless device to perform dial-up networking for a PC such that a cable between the phone and the PC is unnecessary.

Generally, the antenna 209, the transmitter 208, the receiver 210, radio link transmitter 204, radio link receiver 206, the speaker 238, the microphone 212, the tactile alert device 232 and audible alert device 234 are each individually well known in the art, and hence no additional description need be given except as may be necessary to facilitate the understanding of the present invention. Further, the general operation of a radiotelephone is well known in the art and will not be described except as may be necessary to facilitate the understanding of the present invention.

Figure 3:
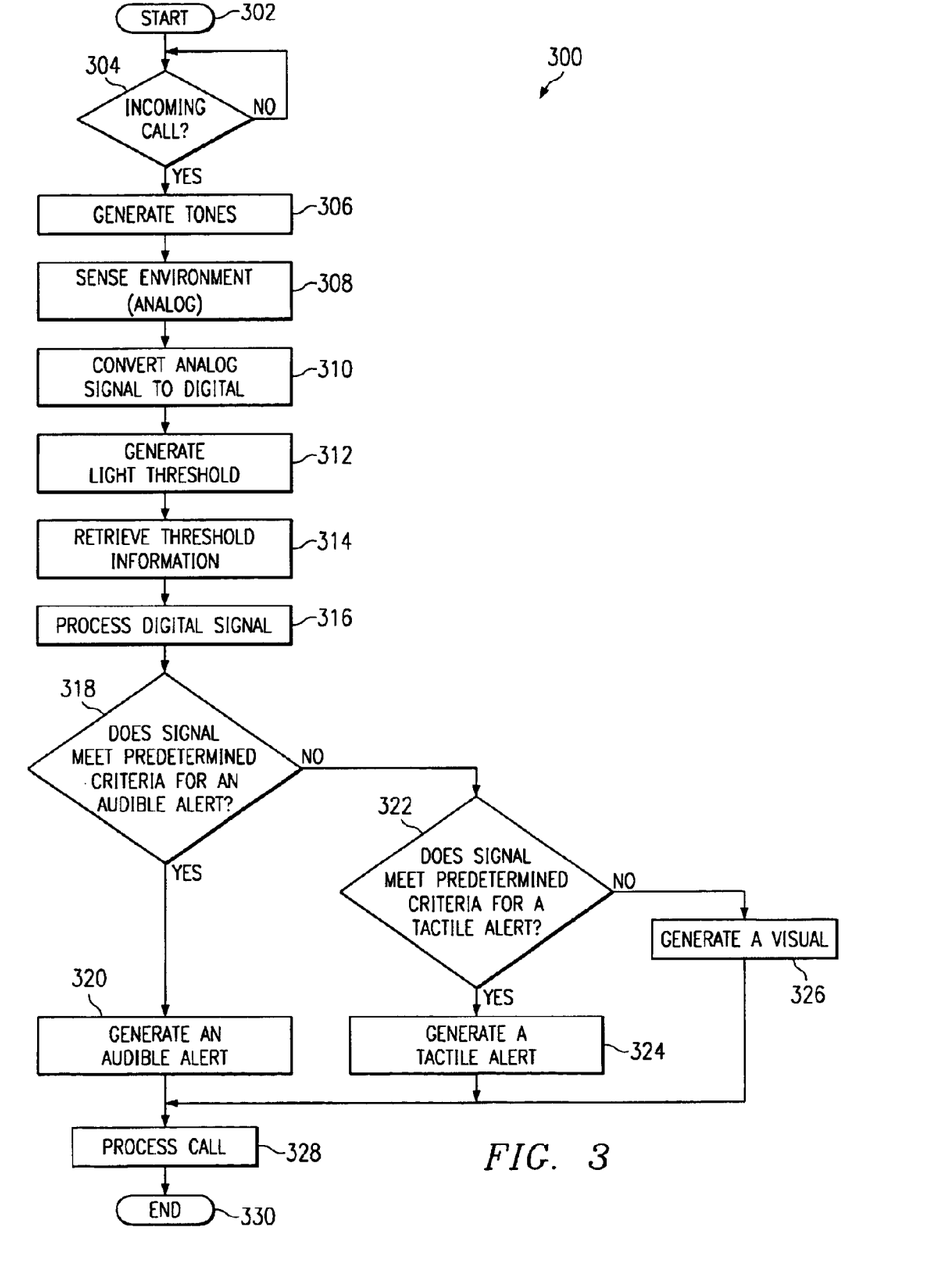
FIG. 3 is a flow chart for illustrating the operation of the second embodiment of the wireless device shown in FIG. 2.

As shown in FIG. 3, in operation, the central processing unit 218 detects an incoming call in decision block 304 to initiate the intelligent alert subroutine 300. The central processing unit 218 and microphone 212 are used to determine the level, spectral distribution and nature of the environment by means of echo/acoustic processing. This involves central processing unit 218 sending signals to the speaker 238 to generate tones as indicated by block 306. The central processing unit 218 controls the codifier 214 connected to the microphone 212 to sense the environment or receive the analog signal that is 'heard' by the microphone 212 as indicated in block 308. The codifier 214 then converts the analog signal into a digital one, as indicated in block 310.

The real time clock 202 (including date) is used for two purposes: 1. to establish a user defined alert based upon time of the day (if so configured) and 2. to estimate the amount of light expected at that time and location to compare with the results of actual light measurement. During particular hours of the day in certain locations, natural day light is expected. Accordingly, central processing unit 218 determines a light threshold, as indicated by block 312, from the time relayed by the real time clock 202 and the preset location selected by the user and stored in memory 216. Using this light threshold, the central processing unit 218 will be able to determine whether the device is in a darkened enclosed receptacle, such as a purse or pocket. In order to determine if the wireless device 200 is muffled in a purse, for example, and adapt the alert accordingly, the program of instructions executed by the central processing unit 218 will combine the predetermined threshold coefficients with proper statistical weights, to arrive at a conclusion of highest probability. For example, if the level of light from the sensor suggests complete darkness, while the real time clock 202 relays a time of 5 PM during summer in Dallas, Tex., this increases the probability that wireless device 200 is in a purse, briefcase, or other carrying accessory.

Responsive to the digital signal, the central processing unit 218 retrieves the threshold coefficients from memory 216 as indicated by block 314. Block 316 illustrates that the central processing unit 218 executes the program of instructions located within the programmable storage device (not shown) to process the digital signal, based upon the predetermined coefficients for motion, caller network identification, RSSI, light, temperature as input to the program of instructions. Central processing unit 218, as decision block 318 indicates, determines whether the processed digital signal meets the predetermined criteria for an audible alert. If it does, block 320 indicates that the central processing unit 218 will send a control signal to the audible alert generator 234 connected to the speaker 238 to generate an audible alert signal. It is envisioned that the volume of the audible alert signal may be determined based upon the determination of the processing of the program of instructions in block 316. If as indicated by decision block 318 the optimum alert signal is not an audible alert signal, the central processing unit 218 will decide whether a tactile alert signal is best, as indicated by decision block 322. If so, the central processing unit 218 will send a control signal to the tactile alert generator 232 to generate a tactile alert signal as indicated by block 324. In the alternative, the central processing unit 218 can send a control signal to display 228 to generate a visual alert signal as indicated by block 326. Accordingly, once the alert signal has been generated, the central processing unit 218 will process the call or message as indicated in block 328.

Where the sensed noise is found to have stationary spectral distribution, the ringer tone of audible alert generator 234 may be adjusted for optimum detectability by means of frequency equalization of the ringing tone. Using frequency equalization, the alert signal is set to ring at the frequency where the signal to noise ratio is highest. In such case, the ringer tone covering the better parts of the audio spectrum is preferable. It is also envisioned, when the noise is found to be intermittent, alerting beeps may be timed to signal during the low ambient noise intervals.

The additional acoustic/echo analysis, derived from generated tones as indicated in block 306, may be used to support or contradict a conclusion that the wireless device 200 is in an enclosed receptacle (i.e. the user may be watching a movie in a dark room). Environment characterization, as indicated in blocks 306–312, may be performed periodically during a standby mode or continuously during and immediately before the alerting event. The periodic environment characterization may be based on all inputs observed throughout a certain period of time or some inputs during a shorter period of observation time for reduced power consumption. As an option, prior to an incoming call, the wireless device 200 may enable the user to display the type of environment that has been automatically determined through the use of a menu on the display 228. The user may then override the preferred alert signal selection.

The user may communicate to the wireless device that the wrong alert has been selected, which will enhance its future success probability, i.e. self learning. In this user activated mode, as described for the first embodiment 100 (refer to FIG. 1c), the user will be able to "train" the wireless device 200 to respond according to the user's preference. The display 228 is capable of displaying menus of information which may be selected. A menu designated for the training of the optimum alert sequence definition may include a default set and reset feature whereby the user sets all of the defaulted values after a series of questions have been answered using a selection key. Within this menu, the user may define the different alerts for different types of environments, such as "quiet", "noisy", "day", "night", "belt, "purse", etc. Accordingly, the user may calibrate the wireless device in typical high ambient noise environment where it is commonly located, such as a factory, to enhance the probability of detecting an optimum alert signal.

In the alternative, a standard defaulted optimum alert sequence definition may be stored within memory 216. The menu may include an option to modify the last alert response given based upon the environment of the wireless device. The user may select the preferred response and store this response so that future determinations will include the user's input whenever the wireless device is in the same environment which generated the last alert response.

Advantages include and are not limited to a wireless device that more effectively determines an optimum alert signal in a high or low ambient noise environment, where the alert signal tone and volume are adapted to the environment. Another advantage of this wireless device is the use of an alert signal activated at an audible frequency band where there is less ambient noise. Since the wireless device automatically adapts its characteristics to the environment, it maximizes its detectability in various environments and reduces probability for a missed call, message, or reminder. In the case of low ambient noise environments, interference caused by an alert signal is minimized, which is important especially in office environments and quiet public places, such as a museum, a library, or a church.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. An apparatus, comprising:
   a microphone;
   a codifier coupled to the microphone;
   a central processing unit coupled to the codifier to control the codifier to convert an analog signal sensed by the microphone into a digital signal;
   at least one alert generator coupled to the central processing unit for generation of the at least one alert signal;
   a memory coupled to the central processing unit for storage of an at least one predetermined value;
   a programmable storage device readable by the central processing unit, the programmable storage device tangibly embodying a program of instructions executable by the central processing unit, wherein the program of instructions and the at least one predetermined value define an alert sequence definition;
   the central processing unit responsive to the digital signal and the alert sequence definition to select an alert signal by generating at least one control signal for the at least one alert generator;
   a transceiver coupled to the central processing unit to communicate with an external device;
   a decoder coupled to the central processing unit;
   a speaker mounted in a housing, the speaker coupled to the decoder;
   the central processing unit responsive to a transmitted signal of the external device received by the transceiver wherein the central processing unit generates a control signal for the speaker to generate a first analog signal and the central processing unit generates a control signal for the codifier to convert a reflected first analog signal sensed by the microphone into a first digital signal, wherein, when the apparatus is placed in a container, the first analog signal is reflected back toward the apparatus and the codifier will convert the reflected first analog signal into the first digital signal at a predetermined delayed interval; and
   the central processing unit responsive to the first digital signal to determine the strength of the reflected first analog signal wherein the strength is compared with at least one predetermined threshold stored in memory to determine an optimum alert signal.

2. An apparatus as recited in claim 1, wherein the at least one alert generator includes:
   a display mounted in the housing and coupled to the central processing unit, the display having at least one feature for generation of a visual alert signal.

3. An apparatus as recited in claim 1, wherein the at least one alert generator includes:
   an audio alert generator coupled between the central processing unit and the speaker for generation of an audible alert signal.

4. An apparatus as recited in claim 3, wherein the central processing unit responsive to the alert sequence definition, adjusts the type of the audible alert signal.

5. An apparatus as recited in claim 3, wherein the central processing unit responsive to the alert sequence definition, adjusts the volume of the audible alert signal.

6. An apparatus as recited in claim 3, wherein the central processing unit responsive to the alert sequence definition, adjusts the frequency of the audible alert signal.

7. An apparatus as recited in claim 3, wherein the central processing unit responsive to the alert sequence definition, adjusts the interval of time for silence between a first and a second audible alert signal.

8. An apparatus as recited in claim 1, wherein the at least one alert generator includes:
   a tactile alert generator coupled to the central processing unit for generation of a tactile alert signal.

9. An apparatus as recited in claim 1, further comprising:
   at least one manually actuated user input coupled to the central processing unit;
   wherein the programmable storage device responsive to the at least one manually actuated user input to alter the last alert signal generated.

10. An apparatus as recited in claim 1, further comprising:
    at least one manually actuated user input coupled to the central processing unit;
    wherein the programmable storage device responsive to the at least one manually actuated user input to alter the alert sequence definition.

11. An apparatus as recited in claim 1, further comprising a housing wherein the microphone, the speaker, the transceiver, and the at least one manually actuated user input are mounted in the housing.

12. An apparatus as recited in claim 1, wherein one of the at least one predetermined value includes at least one high frequency noise range.

13. An apparatus as recited in claim 1, wherein one of the at least one predetermined value includes at least one low frequency noise range.

14. An apparatus as recited in claim 1, wherein the program of instructions includes speech recognition processing instructions.

15. An apparatus as recited in claim 1, wherein the program of instructions includes neuron network processing instructions.

16. An apparatus as recited in claim 1, further comprising a radio link, transceiver coupled to the central processing unit, the radio link transceiver positioned in the housing to communicate with a base station, wherein a transmitted signal from the base station, the predetermined values, and the program of instructions define the alert sequence definition.

17. An apparatus as recited in claim 16, wherein the radio link transceiver uses a short-range, cable replacement, radio technology such as Bluetooth™.

18. An apparatus as recited in claim 1, further comprising a light sensor coupled to the central processing unit to sense light external to the portable wireless communication device, wherein the sensed light, the predetermined values, and the program of instructions define the alert sequence definition.

19. An apparatus as recited in claim 1, further comprising a motion sensor coupled to the central processing unit to sense motion exerted on the portable wireless communication device, wherein the sensed motion, the predetermined values, and the program of instructions define the alert sequence definition.

20. An apparatus as recited in claim 1, further comprising a temperature sensor coupled to the central processing unit to sense temperature external to the portable wireless communication device, wherein the sensed temperature, the predetermined values, and the program of instructions define the alert sequence definition.

21. An apparatus as recited in claim 1 wherein, the predetermined values includes a temperature, motion, high frequency noise, and low frequency noise range.

22. A method of generating an optimum alerting sequence for a wireless communication device having a central processing unit, a codifier, a memory, a programmable storage device tangibly embodying a program of instructions, plurality of alert generators, comprising the steps of:

detecting, by the central processing unit, an incoming call;

generating a first analog signal by a speaker, wherein when the apparatus is in a container, having an interior surface, the first analog signal will be reflected off of the interior surface of the container;

sending a control signal to the codifier coupled to a microphone to receive the reflected first analog signal sensed at the microphone;

converting the reflected first analog signal to a first digital signal;

retrieving a predetermined set of values and coefficients from memory;

determining the strength of the reflected first analog signal by the central processing unit responsive to the first digital signal such that the strength is compared with at least one predetermined threshold stored in a memory as input to determine an optimum alert signal;

processing the first digital signal by the central processing unit to determine an optimum alerting sequence using the predetermined set of values, coefficients, and the first digital signal as inputs for the program of instructions tangibly embodied in the programmable storage device; and generating an alert signal based upon the output of the program of instructions.

23. A method as recited in claim 22, wherein the program of instructions includes speech recognition processing instructions to process a speech pattern recognized in the digital signal as input to determine the optimum alert sequence.

24. A method as recited in claim 22, wherein the program of instructions includes neuron network processing instructions to determine the optimum alert sequence.

* * * * *